(12) United States Patent
Kelly et al.

(10) Patent No.: US 11,378,123 B2
(45) Date of Patent: Jul. 5, 2022

(54) AXIAL DAMPER AND DISPLACEMENT LIMIT FOR TURBOMACHINE WITH ROLLING ELEMENT BEARINGS

(71) Applicant: BorgWarner Inc., Auburn Hills, MI (US)

(72) Inventors: Allan Douglas Kelly, Hendersonville, NC (US); Kurt Henderson, Candler, NC (US); Michael Sean Ward, Etowah, NC (US)

(73) Assignee: BorgWarner Inc., Auburn Hills, MI (US)

( * ) Notice: Subject to any disclaimer, the term of this patent is extended or adjusted under 35 U.S.C. 154(b) by 16 days.

(21) Appl. No.: 16/718,932

(22) Filed: Dec. 18, 2019

(65) Prior Publication Data

US 2021/0190139 A1 Jun. 24, 2021

(51) Int. Cl.
*F16C 27/08* (2006.01)
*F01D 25/16* (2006.01)
(Continued)

(52) U.S. Cl.
CPC .......... *F16C 25/083* (2013.01); *F01D 25/164* (2013.01); *F16C 25/08* (2013.01); *F16C 27/066* (2013.01); *F16C 27/08* (2013.01); *F16C 35/077* (2013.01); *F16F 1/328* (2013.01); *F16F 1/36* (2013.01); *F16F 1/362* (2013.01); *F16F 3/12* (2013.01); *F01D 25/04* (2013.01); *F05D 2220/40* (2013.01); *F05D 2240/50* (2013.01); *F05D 2240/70* (2013.01);
(Continued)

(58) Field of Classification Search
CPC ...... F16C 25/08; F16C 25/083; F16C 27/066; F16C 19/184; F16C 35/077; F16C 27/045; F16C 27/08; F16C 2360/24; F16F 1/32; F16F 1/328; F16F 1/36; F16F 1/362; F16F 3/12; F01D 25/04; F01D 25/164; F05D 2220/40; F05D 2240/50; F05D 2240/70; F05D 2250/611; F05D 2260/96

See application file for complete search history.

(56) References Cited

U.S. PATENT DOCUMENTS 330,492 A * 11/1885 Johnson .................. F16B 39/24
411/149
5,253,852 A * 10/1993 Pleva .................... F16C 25/083
267/162
(Continued)

FOREIGN PATENT DOCUMENTS

EP 2520809 A2 * 11/2012 .............. F16C 27/04
EP 3670340 A1 * 6/2020 ............ F16C 19/547

*Primary Examiner* — Alan B Waits
(74) *Attorney, Agent, or Firm* — von Briesen & Roper, s.c.

(57) ABSTRACT

In accordance with one aspect of the present disclosure, a turbocharger having a rolling element bearing (REB) assembly contained within a bearing housing includes an axial damper configured to dampen and limit axial displacement of the REB assembly. The axial damper can include different embodiments, including an elastomeric axial damper, wire mesh, or oil film, for interrupting contact between the bearing assembly and a displacement limit when an axial displacement force exceeds a preload force. Further, the axial damper can include an apparatus having at least two axially compressible rings, where one of the axially compressible rings includes a displacement limit feature.

15 Claims, 7 Drawing Sheets

(51) Int. Cl.
*F16C 35/07* (2006.01)
*F16F 1/32* (2006.01)
*F16C 25/08* (2006.01)
*F16C 27/06* (2006.01)
*F16F 1/362* (2006.01)
*F16F 3/12* (2006.01)
*F16F 1/36* (2006.01)
*F16C 35/077* (2006.01)
*F16C 27/04* (2006.01)
*F16C 19/18* (2006.01)
*F01D 25/04* (2006.01)

(52) U.S. Cl.
CPC .... *F05D 2250/611* (2013.01); *F05D 2260/38* (2013.01); *F05D 2260/96* (2013.01); *F16C 19/184* (2013.01); *F16C 27/045* (2013.01); *F16C 2360/24* (2013.01)

(56) References Cited

U.S. PATENT DOCUMENTS

| | | |
|---|---|---|
| 8,807,840 B2 | 8/2014 | House et al. |
| 9,581,044 B2 | 2/2017 | House et al. |
| 2012/0024618 A1* | 2/2012 | Houdayer ............ B62D 5/0448 180/447 |
| 2021/0317871 A1* | 10/2021 | Heile ...................... F16C 17/02 |

* cited by examiner

AXIAL DAMPER AND DISPLACEMENT LIMIT FOR TURBOMACHINE WITH ROLLING ELEMENT BEARINGS

TECHNICAL FIELD

The present disclosure generally relates to a turbochargers and turbocharger assemblies for internal combustion engines, and more particularly, relates to turbochargers having rolling element bearings.

BACKGROUND

Turbochargers are used to deliver air at greater density to an engine to allow more fuel to be combusted than what would be possible in a natural aspirated configuration of a similar sized engine. Thus, with the use of turbochargers greater horsepower is achieved without losing fuel efficiency by increasing the mass and aerodynamic frontal area of a passenger vehicle.

However, turbochargers have a problem known as turbo lag, as there can be a delay in the time it takes exhaust flow entering the turbine housing from the exhaust manifold to drive a turbine wheel, which is fixed to a shaft and provides the rotational power to the compressor.

To solve the problem of turbo lag, electric assist turbochargers that include bearing housings having internally housed electric motors configured to rapidly accelerate during the turbo lag period for enhanced engine performance, until an exhaust gas driven turbocharger can provide enough boost, are utilized to minimize turbo lag.

Electric assist turbochargers, and other turbochargers, often have high speed rolling element bearing (REB) systems that require axial preload forces to prevent skidding of their rolling elements (ball bearings), as well as inclusion of axial limits or stops to prevent excessive axial displacement. Such excessive axial displacement can result in deleterious contacts or impellers with intentionally low-clearance housings. Moreover, damping of transient forces is required to accommodate occasions when axial forces may exceed preload forces. Under the latter circumstances, hard contact may be made between the bearing module and an axial limit, producing relatively high, externally measurable, g-forces or acceleration.

U.S. Pat. No. 8,807,840 B2 by House, et al., describes a set of rings that are juxtaposed for proving an axial damping function for an outer sleeve of an REB cartridge. Specifically, a flat ring, that acts as an oil-damped ring, is paired with a retaining ring in a manner that the flat ring moves as one with the cartridge. However, to support managing impact energy and displacement limits, turbochargers with improved axial damping are desired.

SUMMARY

In accordance with an embodiment, a turbocharger includes a rotating assembly that is made of a shaft and a turbine wheel, a bearing housing that has a bearing bore including an interior diameter, a rolling element bearing assembly (REB), and an axial damper. The rolling element bearing assembly can be supported in the bearing housing and include an inner and outer race, a series of rolling elements, and a displacement limit feature. The axial damper is configured to dampen and limit axial displacement of the REB assembly contained within the bearing housing.

In accordance with another embodiment of the present invention, an axial damper apparatus for damping and limiting axial displacement of a REB assembly contained within a bearing housing is disclosed. The axial damper having a first axially compressible ring that is made of an annular wave spring configured to preload a bearing assembly, the wave spring including a plurality of circumferentially spaced axially oriented undulations, and a second axially compressible ring made of a washer configured for a constant preload engagement with the wave spring in spaced contact regions on one axial side of the washer. In one embodiment the washer includes axially extending projections, and each projection is circumferentially spaced from any one of the contact regions. Further, each of the projections extends from the one axial side toward the wave spring. In this embodiment, each projection is axially spaced from physical contact with the wave spring until an axial preload force is exceeded and the projections provide an axial displacement limit of compression of the wave spring against the washer.

Yet another embodiment provides an axial damper for damping and limiting axial displacement of a REB assembly contained within a bearing housing. The axial damper includes a first axially compressible ring made of an annular wave spring configured to preload a bearing assembly, the wave spring including a plurality of circumferentially spaced axially oriented crests and troughs, and a second axially compressible ring made of an annular wave spring configured to preload a bearing assembly. In this embodiment, the wave spring includes a plurality of circumferentially spaced crest and troughs, and the troughs of the second axially compressible ring are configured to provide a constant preload engagement with the crests of the first axially compressible ring. In a further embodiment the axial damper can also include an elastomeric displacement stop bonded between the crests of the second axially compressible ring and the troughs of the first axially compressible ring.

These and other aspects and features of the present disclosure will be more readily understood when read in conjunction with the accompanying drawings.

DETAILED DESCRIPTION

Figure 1:
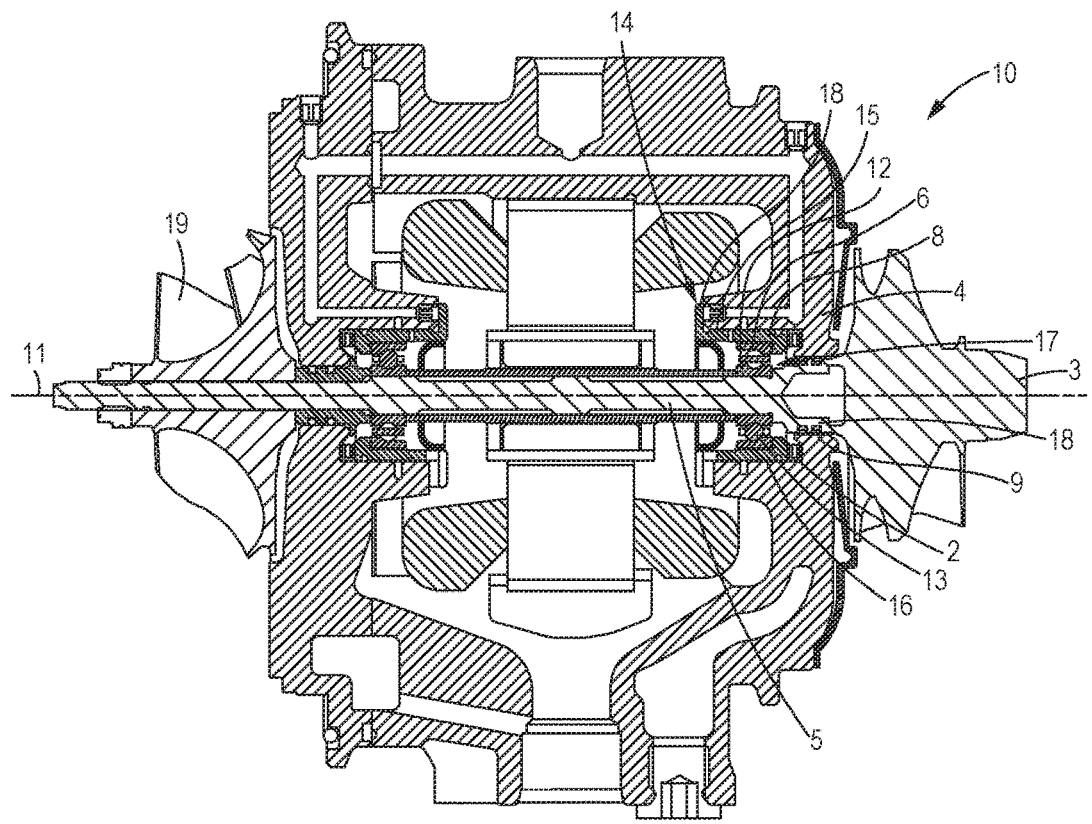
FIG. 1 is a sectional view of a turbocharger assembly having a preload wave spring and axial displacement limit according to one embodiment of the present disclosure.

Referring now to the drawings, FIG. 1 is a sectional view of a turbocharger assembly 10 having a preload spring 2 and axial displacement limit 14 according to one embodiment of the present disclosure. The turbocharger assembly 10 further includes a shaft 5 having an axis 11, a bearing housing 4, a single row rolling element bearing (REB) assembly 17, and a compressor wheel 19 and a turbine wheel 3 both rotatable connected to the shaft 5.

Moreover, the bearing housing 4 has an inner diameter bore 16 that supports the REB assembly 17 and a seal ring 9 that fits in groove 18 that is cut into the shaft 5.

Some REB systems use a cartridge to retain the bearing system, while some use the outer race as the cartridge. For the purpose of clarity, it is assumed that the assembly mentioned herein can be either configuration. The REB assembly 17 has an inner race 12 connected to the shaft 5, an outer race 6 connected to a damper cup 8 that is connected to the inner diameter bore 16 of the bearing housing 4. Located between the inner and outer race 12, 6 are a series of rolling elements 13 circumferentially spaced between the inner and outer race 6, 12. Thus, when exhaust gases spin the turbine wheel 3, the shaft 5 spins along with the connected inner race 12 and the associated series of rolling elements 13. The outer race 6 stays stationary inside of the bearing housing 4. The series of rolling elements 13 are one or more ball bearings made out of ceramic but can be any ball bearings typically used in turbochargers having REB assemblies.

The preload spring 2 is located between the bearing housing 4 and the damper cup 8. The preload spring 2 is used to apply a preload force to prevent skidding of the series of rolling elements 13. Skidding of the rolling elements 13 may occur in prior art devices if the individual ball bearings in the series of rolling elements are not spinning at the same speed. This is more likely to happen during rapid turbocharger accelerations or axial load reversals. To prevent skidding, the preload force, in one embodiment, is designed to be between ⅓ to ⅔ the axial force's capable of being generated by the turbocharger.

The turbocharger assembly 10 further includes an axial displacement limit 14 or stop. In one embodiment the displacement limit 14 includes a placement stopper 18 that is attached to the damper cup 8. During operation, axial forces created from the spinning compressor wheel or turbine wheel can cause axial displacement of the REB assembly 17, which is not axially or radially rigid to allow for oil damping films both radially and axially. Axial displacement can result in deleterious contacts of the compressor wheel 3 with intentionally low clearance housings if unconstrained. Moreover, axial displacement forces can exceed preload forces provided by the preload spring 2, causing contact between the placement stopper 18 of the displacement limit 14 and the bearing housing 4, causing externally measurable acceleration.

The damper cup 8 serves to support the REB assembly 17 inside of the inner diameter bore 16. As shown in the FIG. 1 embodiment, the displacement limit 14 includes a placement stopper 18 that is connected to the damper cup 8. The placement stopper 18, in the FIG. 1 embodiment, is shown to bend upwards 90 degrees to allow said stopper to contact the bearing housing's 4 shoulder 15 to prevent the damper cup 8, and attached REB assembly 17, from being displaced too far axially in the direction of the compressor wheel 3 by axial displacement forces generated from the rotation of the compressor wheel 19 or the turbine wheel 3.

In one embodiment, the outer race 6 is directly in contact with the inner diameter bore 16 of the bearing housing 4 and a damper cup is not used (not shown). In this embodiment, the placement stopper 13 is connected to the outer race 6. In another embodiment, multi-row REB assemblies are used instead of the single-row REB assembly depicted.

In a further embodiment, the REB assembly 17, damper cup 8, displacement limit 17, and the preload spring 2, as well as any of the elements discussed below, can be located on the compressor wheel 19 end of the shaft 5 and not only the turbine wheel 3 end of the shaft 5 as depicted. Moreover, in another embodiment, the REB may only be on one end of the shaft 5, and the opposite end of the shaft 5 rigidly contacting an axial stop (not shown).

Figure 2:
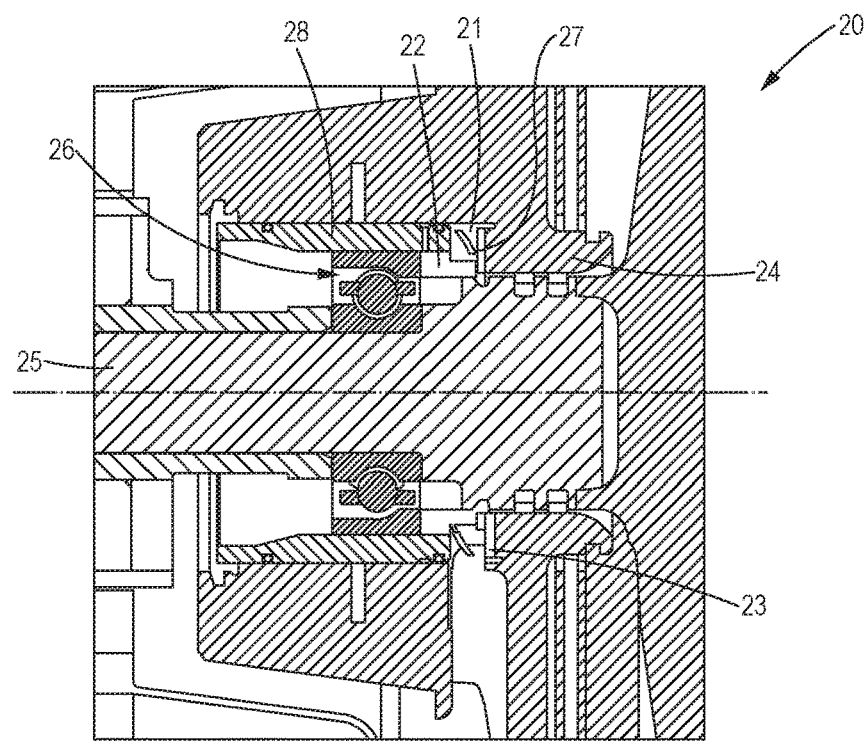
FIG. 2 is a magnified sectional view of a turbocharger assembly having a wave preload spring, displacement limit, and anti-wear shim according to one embodiment of the present disclosure.

The turbocharger assembly 20, best shown in FIG. 2, includes the elements of a preload spring 21, displacement limit 23, and an optional anti-wear shim 27. In one example, the anti-wear shim 27 is optional depending on wave spring geometry and housing material used, e.g., it may be included if the housing is made of a softer aluminum but might not be if the housing is made out of gray iron. Further depicted are the REB assembly 26 that is connected to the shaft 25 and the damper cup 28. The damper cup further includes the placement stopper 22 that differs from the FIG. 1 embodiment in that it is located axially towards the turbine instead of axially towards the center of the turbocharger assembly, relative to the REB assembly 26. The FIG. 2 embodiment further includes the anti-wear shim 27, which is metal wire mesh and meant to absorb energy and reduce impact forces.

Figure 3:
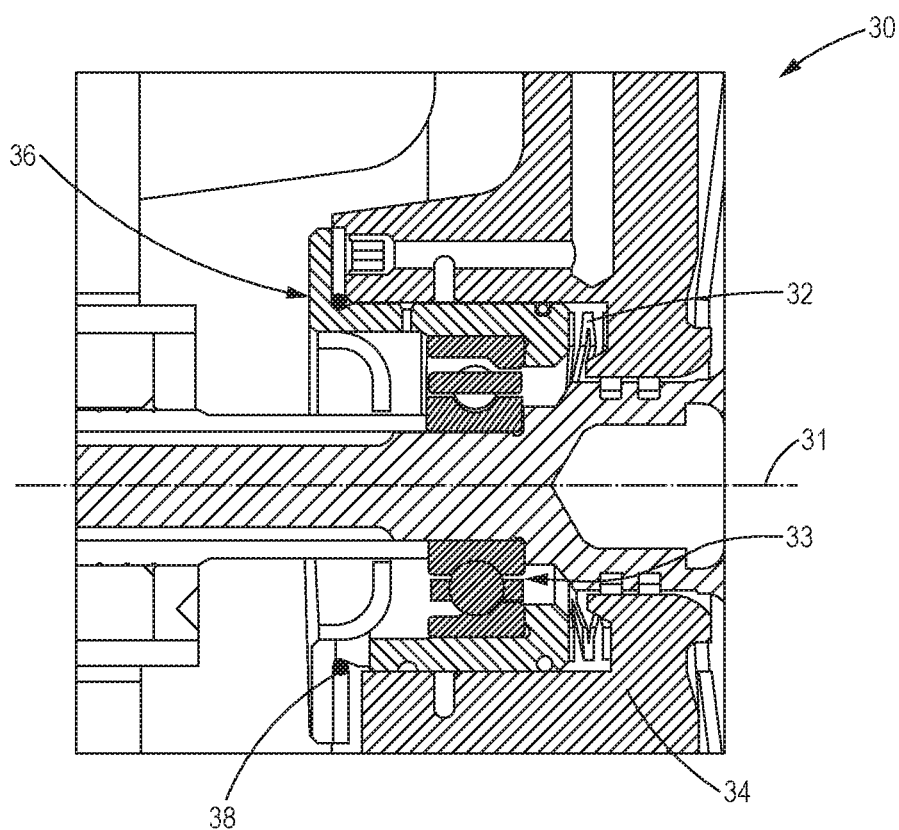
FIG. 3 is a magnified sectional view of a turbocharger assembly having an axial damper according to one embodiment of the present disclosure.

As best shown in FIG. 3, a turbocharger assembly 30 has an axial damper 38. The axial damper 38, in the FIG. 3 embodiment, is located on placement stopper 13. The axial damper 38 prevents hard contact when axial displacement forces overcome the preload spring 32 by interrupting the displacement limit surface contact with the axial damper 38.

The axial damper solves the issues with the FIGS. 1 and 2 embodiments of hard contact being made between the bearing housing and the displacement limit when axial forces exceed preload forces. The axial damper 38 acts to dampen the impact energy as well as a displacement limit to prevent the displacement of the REB assembly 33 due to axial displacement forces (incidentally, elastomer converts energy to heat). Managing the impact energy is necessary to achieve durability and noise and vibration harshness expectations to consumers of vehicles having turbochargers.

Figure 4:
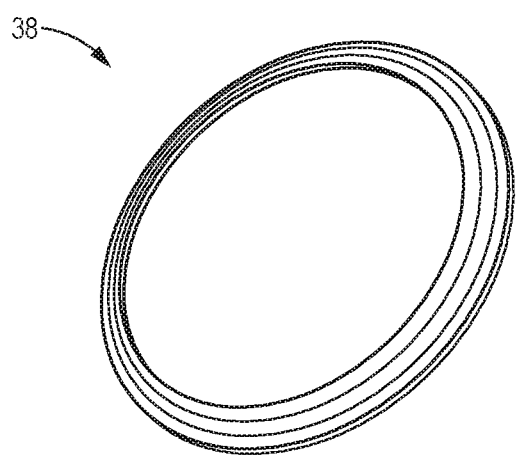
FIG. 4 is a perspective view of the elastomeric axial damper as shown in FIG. 3.

Depicted in FIG. 4 is the elastomeric axial damper as shown in FIG. 3 in an isolated view to show its ring shaped structure. As shown, the axial damper 38 is ring shaped and made out of an elastomeric material such as acrylate, butyl, polyurethane or silicone. The axial damper 38 can be shaped like an O-ring, D-ring, or any suitable shape. In one embodiment, it may be a partial ring that may fit in the inner diameter bore of the housing, and may contain to cutouts as to not block the oil supply or drains. In another embodiment, the axial damper 38 may be intermittently formed around the features of the housing or may be applied as a coating rather than a formed ring shape.

Figure 5:
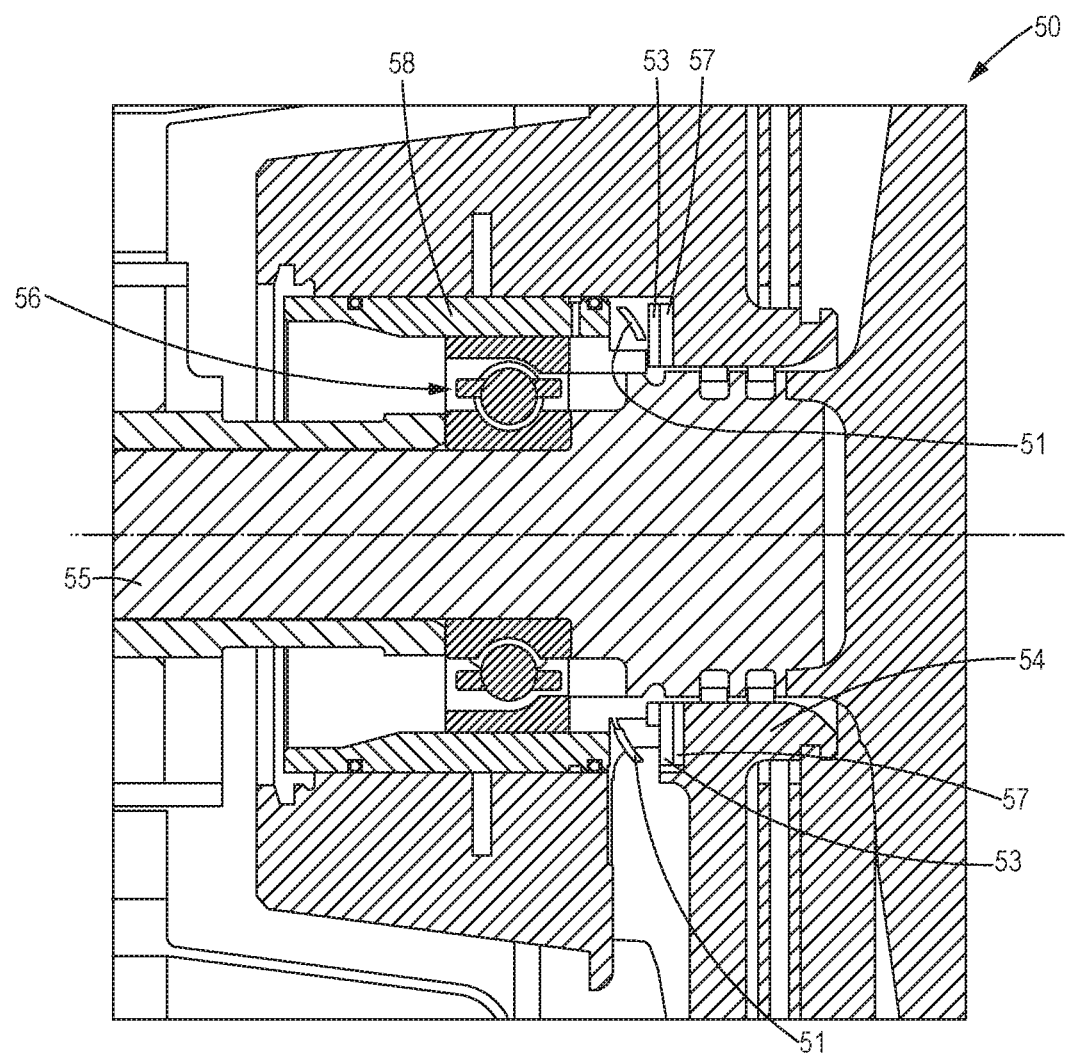
FIG. 5 is a magnified sectional view of a turbocharger assembly having a wire mesh axial damper and anti-wear shim according to one embodiment of the present disclosure.

To better show the turbocharger assembly 50, FIG. 5 depicts a magnified view showing in detail a wire mesh axial damper 57 and anti-wear shim 53. In one example, the placement of the axial damper and the anti-wear shim 53 may be reversed from the FIG. 5 embodiment. Also depicted are the preload spring 51, the bearing housing 54, the shaft 55, the REB assembly 56, and the damper cup 58. In the FIG. 5 embodiment, the axial damper 57 is made out of a wire mesh material and is ring shaped to be located circumferentially around the outside diameter of the bearing assembly's 54 bore hole for the thrust bearing 59. In the FIG. 5 embodiment, an anti-wear shim 53 is located next to the axial damper 57 and can be a metal ring or pad and serves to reduce harshness and absorb impact energy between a placement stopper portion of the damping cup 58 and the bearing housing 54.

Figure 6:
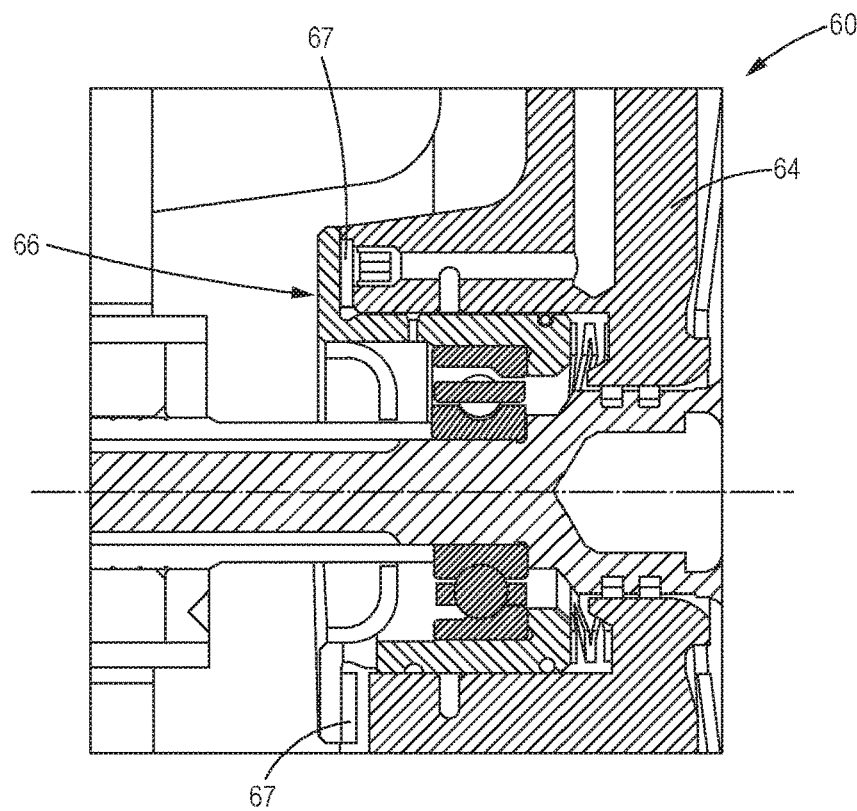
FIG. 6 is a magnified sectional view of a turbocharger assembly having a wire mesh axial damper according to one embodiment of the present disclosure.

According to one embodiment of the present disclosure, FIG. 6 depicts a magnified sectional view of a turbocharger assembly 60 having a wire mesh axial damper 67. As shown, in this embodiment the axial damper is located circumferentially around the placement stopper 66 that is connected to the damper cup and is meant to act as a displacement limit. The axial damper 67 is meant to absorb energy and soften the blow between any potential impact between the placement stopper 66 and the bearing housing 64. Axial damper 67, in this embodiment, is made out of a wire mesh material that is suited for handling the hot and highly kinetic conditions inside of the turbocharger.

Figure 7:
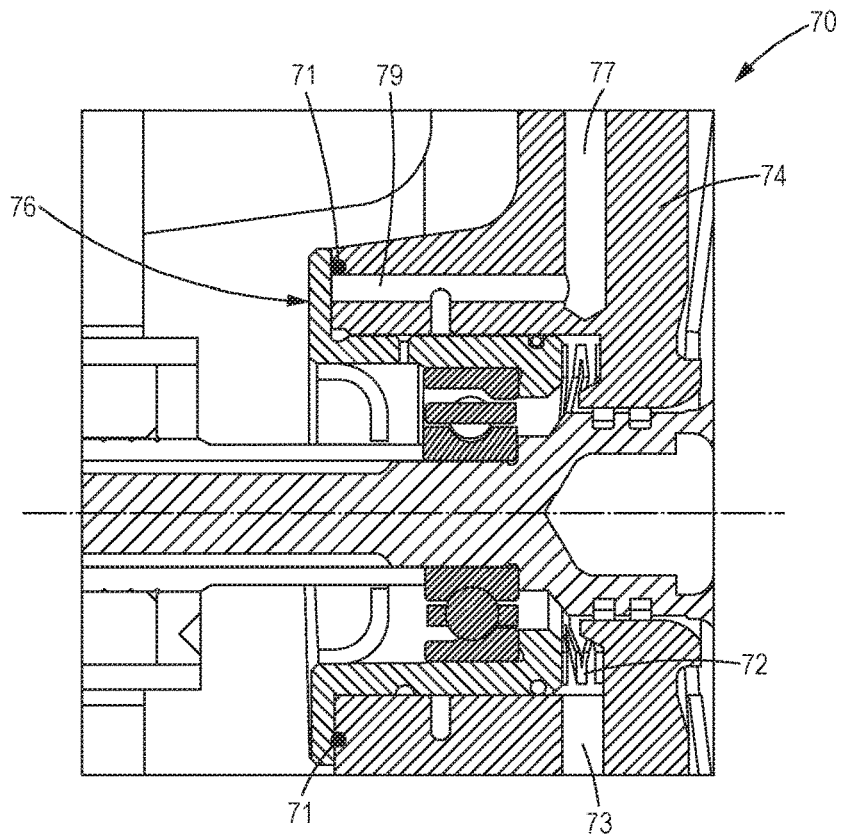
FIG. 7 is a magnified sectional view of a turbocharger assembly having an oil film axial damper for a turbocharger assembly according to one embodiment of the present disclosure.

According to the present disclosure, as depicted in FIG. 7, further turbochargers including a turbocharger assembly 70, can have an oil film axial damper 71 to act as the axial damper or displacement limit. In this embodiment, depicted are a first oil supply channel 77, a second oil channel 79, the bearing housing 74, an oil drain 73, and placement stopper 76. In this embodiment, oil can flow from the first oil supply channel 77 into the second oil channel 79 where it is dispensed to form an oil film axial damper 71 in between the displacement stopper 66 and the bearing housing 74. This oil film axial damper 71 serves to interrupt contact between the displacement stopper 66 and the bearing housing 64.

Figure 8:
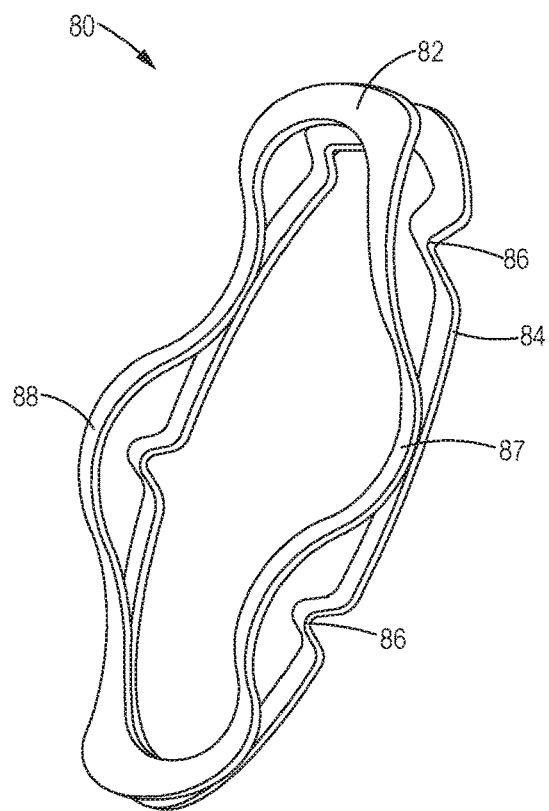
FIG. 8 is a perspective view of an axial damper for a turbocharger assembly according to one embodiment of the present axial damper apparatus.

The axial damper 80 for a turbocharger assembly, in one embodiment can include two rings. As depicted in FIG. 8, in this embodiment, is an axial damper 80 for damping and limiting axial displacement of a REB assembly contained within a bearing housing of a turbocharger. The axial damper 80 has a first axially compressible ring 82 that is made of a preload wave spring that has a plurality of circumferentially spaced axially oriented undulations, forming crests 88 and troughs 87, and is configured to preload a REB assembly. The first axially compressible ring 82 is made out of a metal material or any material suitable to apply a preload force and withstand the high temperatures and kinetic environment of a turbocharger.

The axial damper further has a second axially compressible ring 84 that is made of a washer configured for a constant preload engagement with the first axially compressible ring 82 in spaced contact regions on one axial side of the washer, the washer also including axially extending projections 86. Each of the axially extending projections 86 extend from the one axial side and are circumferentially spaced from any of the contact regions with the first axially compressible ring 82. In one embodiment, the axially extending projections are located underneath the crest of the first axially compressible ring, and the troughs serve as the contact points. The second axially compressible ring 84 is made out of a metal material or any material suitable to apply a preload force and withstand the high temperatures and kinetic environment of a turbocharger. In a further embodiment the axially extending projections 86 are stamped into the washer.

In operation, the first axially compressible ring 84 serves as the preload wave spring and is configured to apply a preload force to a REB assembly inside of a turbocharger's bearing housing. The first axially compressible ring 84 is configured to apply a preload force of at least $1/3$ to $2/3$ of the capable axial displacement force generated during operation of the turbocharger. Once axial displacement forces are enough to overcome the first axially compressible ring 82, the axially extending projections 86 serve as the displacement limit or stop, interrupting the impact of the REB assembly with the bearing housing by absorbing the impact energy.

In one embodiment, the axial damper 80 replaces the preload wave spring 2 in the FIG. 1 embodiment. In this embodiment, since the second axially compressible ring's 84 axially extendable projections 86 serve as the displacement limit or stop, there is no need for the displacement limit 18 or placement stopper 13.

Figure 9:
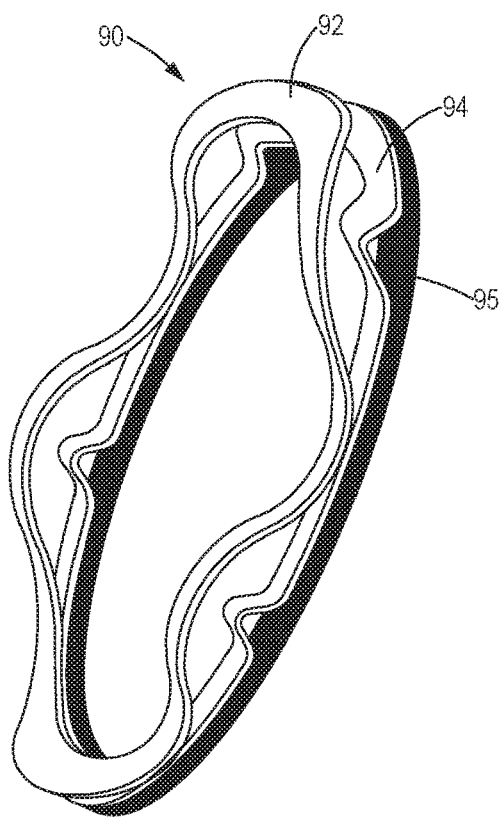
FIG. 9 is a perspective view of the axial damper apparatus of FIG. 8 further having a damping layer.

The axial damper 80 apparatus of FIG. 8 further having an additional damping layer is best shown in FIG. 9. In this embodiment, a third axially compressible ring 95 is an elastomeric or wire mesh damping layer and is in constant preload engagement with a second axial side of the washer. In one embodiment, during operation, the damping layer is in contact with the bearing housing and the preload wave spring is in contact with the REB assembly or damper cup. In another embodiment, the damping layer is in contact with the REB assembly or damper cup and the preload wave spring is in contact with the bearing housing.

Figure 10:
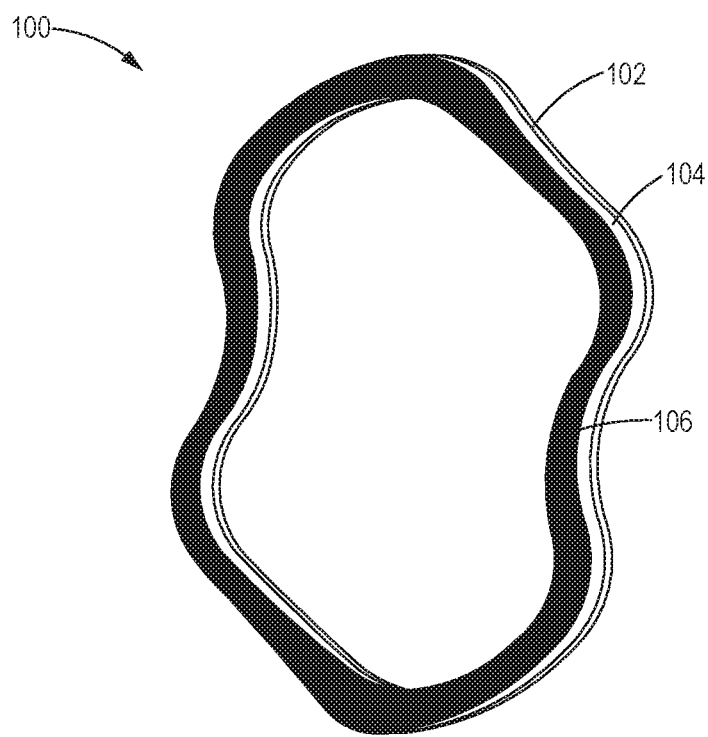
FIG. 10 is a perspective view of a damped spring subassembly, henceforth referred to as a compressible ring, for a turbocharger assembly having a constraining layer, viscoelastic constraining layer, and a preload spring according to one embodiment of the present axial damper apparatus.

An axial damper 100 for a turbocharger assembly is shown in FIG. 10 and details a constraining spring 106, a viscoelastic, or elastic, constrained layer 104, and a preload spring 102 according to one embodiment of the present disclosure. In one embodiment, the viscoelastic, or elastic, constrained layer is located in between the preload spring 102 and the constraining spring 106, and the constraining spring 106 has a tension that is less than the tension of the preload spring. In a further embodiment, the preload spring 102 has a thickness and the constraining spring 106 has a thickness less than the preload spring 102, and this unequal spring thickness transfers lateral deflection into shear loading of the viscoelastic, or elastic, constrained layer 106.

In one embodiment, two of the layers of the axial damper 100 combine with the FIG. 8 axial damper. In this embodiment, the first axially compressible ring 82 further comprises a constraining spring 106 having a first and second axial side and a viscoelastic, or elastic, constrained layer 104 having a first and second axial side. In this embodiment the axial side of the constraining spring 106 is in contact with the first axial side of the viscoelastic, or elastic, constrained layer 104, and the second axial side of the viscoelastic, or elastic, constrained layer is in contact with an axial side of the preload wave spring 82.

Figure 11:
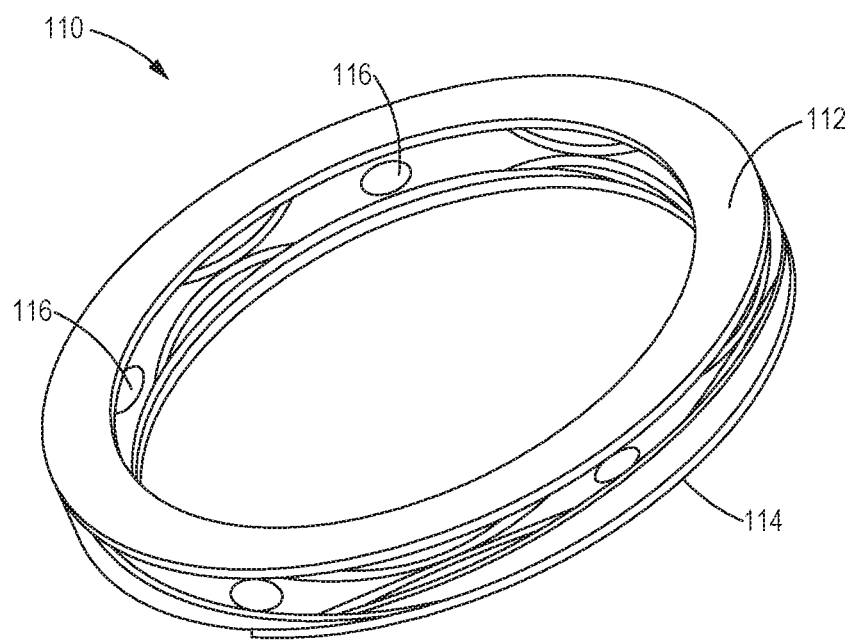
FIG. 11 is a perspective view of an axial damper for a turbocharger having displacement stops located between the preload springs according to one embodiment of the present axial damper for damping and limiting axial displacement of a rolling element bearing cartridge.

As depicted in FIG. 11, a axial damper 110 for a turbocharger having displacement stops 116 located between a first 112 and a second 114 preload wave springs is shown.

The displacement stops 116 can be made out of an elastomeric material, and in one embodiment, are bonded between the crests of the first 112 and second 112 preload wave springs. In this embodiment, the axial damper 110 could take the place of a preload spring, for example, the preload spring 2 of FIG. 1. In this embodiment, there does not need to a separate displacement limit as the displacement stops 116 perform the function of a displacement limit and axial damper by not allowing the preload wave springs crest to contact each other during compression of said springs in between a bearing housing and REB assembly or damper cup.

Figure 12:
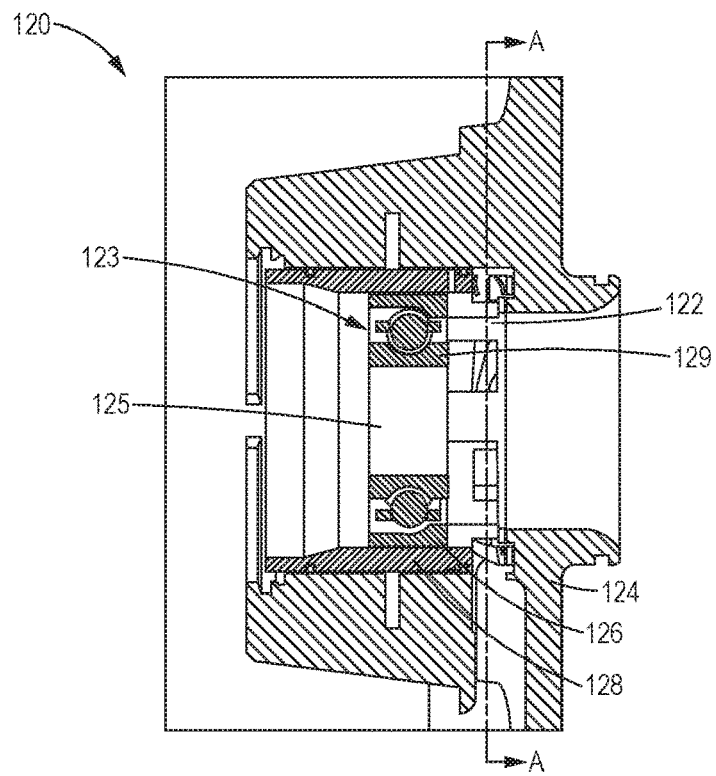
FIG. 12 is a magnified cross-sectional view of a turbocharger assembly having an axial damper according to one embodiment of the present disclosure.

In order to best show the placement of the axial dampers as discussed above, in an exemplary embodiment, FIG. 12 depicts a turbocharger assembly 120 having an axial damper 122 according to one embodiment of the present disclosure. FIG. 12 further depicts the bearing housing 124, the REB assembly 123 including the inner race 129 and the outer race 126, the shaft 125, and the damper cup 128. In one embodiment, the axial damper 122 is axially located in between the REB cartridge and the bearing housing and radially located, at least partially, inside of the damper cup 128 and the inner diameter bore of the bearing housing 124. In a further embodiment, the axial damper 122 could be located axially in between the damper cup 128 and the bearing housing 124. In the FIG. 12 embodiment, the axial damper 122 is the axial damper as shown in FIG. 11, but in a further embodiment, the axial damper 122 could be any the axial damper embodiments shown in FIGS. 4-6 and 8-10.

Figure 13:
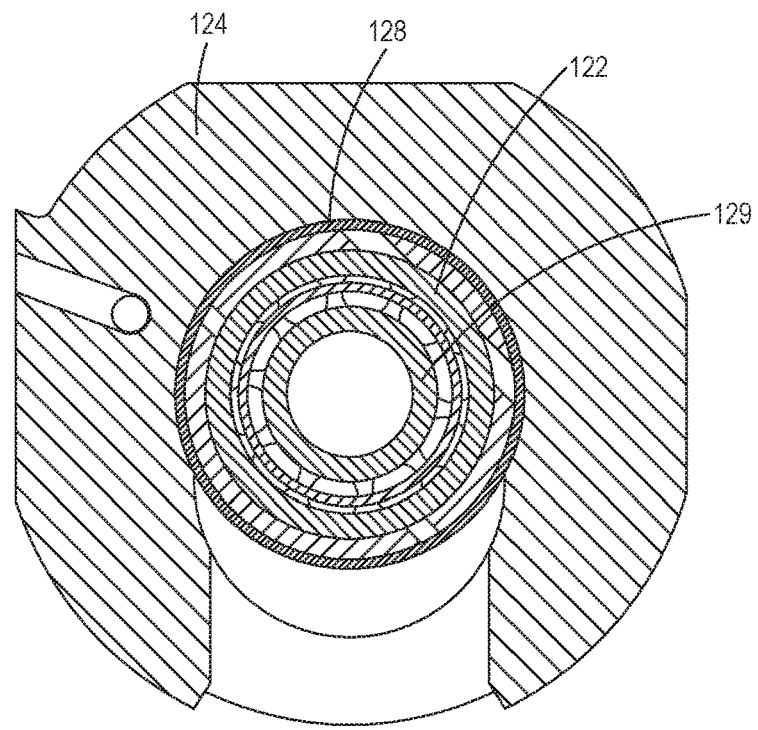
FIG. 13 is a cross-sectional view of section AA of the turbocharger assembly as shown in FIG. 12.

In, FIG. 13 a cross-sectional view of section AA of the turbocharger assembly 120 as shown in FIG. 12 is depicted. In this view the inner race 129, the axial damper 122, the damper cup 128, and the bearing housing 124 are shown.

INDUSTRIAL APPLICABILITY

In general, the teachings of the present disclosure may find broad applicability in many industries including, but not limited to, automotive, single-track vehicle, marine, electronic, stationary power and transportation industries. In particular, the present disclosure may find applicability in any industry using engines operating with turbochargers having REB assemblies.

Significant improvements in efficiency, durability of turbochargers, and reduction of noise levels in a vehicle cabin may be realized utilizing the teachings of the present disclosure. Electronic assist turbocharger's external housing vibrations are documented to produce forces between 2-5 g, causing significant noise levels in passenger vehicles. Customer complaints are common when housing acceleration forces exceed 1 g, thus not meeting Noise Vibration Harshness (NVH) expectations. Damping axial impact forces with methods disclosed will improve vibrations and noise characteristics of electric assist turbochargers to satisfy customer expectations. The improvements of the present invention may correspond to less than 1 g vibration forces originating from an intentionally low clearance electric assist turbocharger due to the axial damping and displacement limit features and elements.

A turbocharger assembly 30 that has a single row REB assembly 33 is shown in FIG. 3. In particular, FIG. 3 depicts the axial damper 36 installed in the turbocharger assembly 30, as shown in isolation in FIG. 4. During operation, the axial damper 36 works to dampen transient forces to accommodate occasions when axial forces may exceed preload forces, generated by preload spring 32, preventing hard contact between the bearing housing 34 and the displacement limit 36. Thus, the FIG. 3 embodiment, as well as the embodiments in FIGS. 5-7, provide improved managing of impact energy and preventing high measurable acceleration in a vehicle cabin.

In order to dampen and limit axial displacement, FIG. 8 depicts an axial damper 80 apparatus for a REB assembly contained within a bearing housing. In particular, FIG. 8 depicts a first axially compressible ring 82 and a second axially compressible ring 84, that are capable of replacing a preload spring, such as preload spring 2 of FIG. 1, in a turbocharger having a REB assembly. The axial damper's 80 first axially compressible ring 82 has a wave preload spring, and the second axially compressible ring 84 has axially extending projections 86 that act as a displacement limit. Thus, the FIG. 8 embodiment, as well as the FIG. 9-11 embodiments, can act as an improved axial damper and a displacement limit for turbochargers having REB assemblies. Thus, the turbocharger's REB assembly do not need traditional displacement limit feature on a damper cup, which is expensive to machine and requires excessive stock material removal.

As depicted the axial damper's 80, 90, 100, and 110 incorporation of a preload spring having a built in displacement limit feature or element enables a reduction in package size, cost, and weight of the turbocharger.

While the forgoing detailed description has been provided with respect to certain specific embodiments, it is to be understood the scope of the disclosure should not be limited to such embodiments. The breadth and spirit of the present disclosure is broader than the embodiments specifically disclosed and encompassed within the following claims.

Moreover, while some features are described in conjunction with certain specific embodiments, these features are not limited to use with only the embodiment with which they are described. Rather, aspects of the specific embodiments can be combined with or substituted by other features disclosed on conjunction with alternate embodiments.

What is claimed:

1. A turbocharger including:
   a rotating assembly including a shaft and a turbine wheel attached to one end of the shaft;
   a bearing housing including a bearing bore having an interior diameter;
   a rolling element bearing assembly supported in said bearing housing, the rolling element bearing assembly comprising an inner race in connection to the shaft, an outer race in connection to the interior diameter of the bearing housing directly or indirectly with a damper cup, a series of rolling elements circumferentially spaced between the inner and outer race, each rolling element in contact with the inner and outer race; and
   an axial damper comprising:
      a first axially compressible ring including an annular wave spring having circumferentially spaced axially oriented undulations, and
      a second axially compressible ring comprising a washer configured for a constant preload engagement with the wave spring in spaced contact regions on one axial side of the washer, the washer including axially extending projections, each projection being circumferentially spaced from any one of the contact regions, each of the projections extending from the one axial side toward the wave spring, each projection being axially spaced from physical contact with the wave spring until an axial preload force is exceeded, and the projections providing an axial displacement limit of compression of the wave spring against the washer, wherein the axial damper is configured for damping and limiting axial displacement of the rolling element bearing assembly contained within the bearing housing.

2. The turbocharger of claim 1, wherein the rolling element bearing assembly further comprises a placement stopper connected to the damper cup.

3. The turbocharger of claim 2, wherein the placement stopper is configured to limit how far the rolling element bearing assembly can axially move inside the interior diameter bore.

4. The turbocharger of claim 3, wherein the axial damper comprises a third axially compressible ring that is an elastomeric or wire mesh damping layer that is in constant preload engagement with a second axial side of the washer.

5. The turbocharger of claim 4, wherein the axial damper is located between the placement stopper and the bearing housing.

6. The turbocharger of claim 3, wherein the axial damper includes a wire mesh layer.

7. The turbocharger of claim 6, wherein the wire mesh layer is located between the placement stopper and the bearing housing.

8. The turbocharger of claim 1, wherein the rolling element baring bearing assembly further includes an anti-wear shim, and wherein the axial damper is located between the anti-wear shim and the bearing housing.

9. The turbocharger of claim 1, wherein the axial damper is located between the rolling element bearing assembly and the bearing housing.

10. The turbocharger of claim 9, wherein the axial damper is in contact with the damper cup.

11. An axial damper apparatus for damping and limiting axial displacement of a rolling element bearing assembly contained within a bearing housing, comprising:
a first axially compressible ring comprising an annular wave spring configured to preload a bearing assembly, the wave spring including a plurality of circumferentially spaced axially oriented undulations; and
a second axially compressible ring comprising a washer configured for a constant preload engagement with the wave spring in spaced contact regions on one axial side of the washer, the washer including axially extending projections, each projection being circumferentially spaced from any one of the contact regions, each of the projections extending from the one axial side toward the wave spring, each projection being axially spaced from physical contact with the wave spring until an axial preload force is exceeded, and the projections providing an axial displacement limit of compression of the wave spring against the washer.

12. The axial damper apparatus of claim 11, further comprising a third axially compressible ring, wherein said third axially compressible ring is an elastomeric or wire mesh damping layer, the third axially compressible ring in constant preload engagement with a second axial side of the washer.

13. The axial damper apparatus of claim 11, wherein the first ring further comprises a constraining spring having a first and second axial side, a viscoelastic layer having a first and second axial side, wherein said second axial side of said constraining spring is in contact with the first axial side of said viscoelastic constrained layer, and the second axial side of said viscoelastic constrained layer is in contact with an axial side of wave spring.

14. An axial damper for damping and limiting axial displacement of a rolling element bearing assembly contained within a bearing housing, comprising:
a first axially compressible ring comprising an annular wave spring configured to preload a bearing assembly, the wave spring including a plurality of circumferentially spaced axially oriented crests and troughs;
a second axially compressible ring comprising an annular wave spring configured to preload a bearing cartridge, the wave spring including a plurality of circumferentially spaced crest and troughs, wherein the troughs of the second axially compressible ring are configured for a constant preload engagement with the crests of the first axially compressible ring; and
at least one elastomeric displacement stop bonded between the crests of the second axially compressible ring and the troughs of the first axially compressible ring.

15. The axial damper of claim 14, wherein the at least one elastomeric displacement stop is cube or spherical shaped.

\* \* \* \* \*